(12) United States Patent
Zeller

(10) Patent No.: US 9,130,427 B2
(45) Date of Patent: Sep. 8, 2015

(54) ARRANGEMENT FOR PRODUCING A STAR CONNECTION, IN PARTICULAR OF THE STATOR WINDINGS OF AN ELECTROMOTOR, AND ELECTROMOTOR

(75) Inventor: Peter Zeller, Oftersheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 403 days.

(21) Appl. No.: 13/395,086

(22) PCT Filed: Aug. 20, 2010

(86) PCT No.: PCT/EP2010/005130
§ 371 (c)(1),
(2), (4) Date: Mar. 8, 2012

(87) PCT Pub. No.: WO2011/029523
PCT Pub. Date: Mar. 17, 2011

(65) Prior Publication Data
US 2012/0169164 A1 Jul. 5, 2012

(30) Foreign Application Priority Data

Sep. 8, 2009 (DE) .................. 10 2009 040 520
Aug. 2, 2010 (DE) .................. 10 2010 033 045

(51) Int. Cl.
*H02K 11/00* (2006.01)
*H02K 3/28* (2006.01)
*H02K 3/52* (2006.01)

(52) U.S. Cl.
CPC ................. *H02K 3/28* (2013.01); *H02K 3/521* (2013.01); *Y10T 29/49194* (2015.01)

(58) Field of Classification Search
CPC ......... H02K 5/225; H02K 3/50; H02K 3/522; H02K 3/28; H02K 3/521; Y10T 29/49194
USPC ............................................................ 310/71
See application file for complete search history.

(56) References Cited

U.S. PATENT DOCUMENTS

| 2,935,632 | A | * | 5/1960 | Schmitz, Jr. .................. 310/249 |
| 3,495,111 | A | * | 2/1970 | Haydon .................... 310/156.21 |
| 3,976,740 | A | * | 8/1976 | Klingler ......................... 264/229 |
| 4,952,829 | A | * | 8/1990 | Armbruster et al. ........ 310/68 D |
| 5,762,526 | A | * | 6/1998 | Kuramoto et al. ............ 439/877 |

(Continued)

FOREIGN PATENT DOCUMENTS

| DE | 3320644 A1 * 12/1984 | ............. H02K 19/38 |
| EP | 0 863 601 | 9/1998 |

(Continued)

OTHER PUBLICATIONS

International Search Report, issued in corresponding International Application No. PCT/EP2010/005130.

(Continued)

*Primary Examiner* — Alex W Mok
(74) *Attorney, Agent, or Firm* — Kenyon & Kenyon LLP

(57) ABSTRACT

An arrangement for producing a star connection in the case of an electromotor, in particular three-phase motor; first crimp sleeves being slid onto stator winding-wire end regions and joined thereto; the first crimp sleeves being joined to the second crimp sleeves by a respective welded connection; the second crimp sleeves being slid onto an electrical line and joined thereto.

15 Claims, 5 Drawing Sheets

(56) References Cited

U.S. PATENT DOCUMENTS

| | | | |
|---|---|---|---|
| 5,900,687 A * | 5/1999 | Kondo et al. | 310/71 |
| 7,365,460 B2 * | 4/2008 | Herlet et al. | 310/71 |
| 2002/0180299 A1 * | 12/2002 | Oohashi et al. | 310/184 |
| 2003/0201688 A1 * | 10/2003 | Yamamura et al. | 310/216 |
| 2005/0236933 A1 * | 10/2005 | Florian et al. | 310/328 |
| 2007/0205678 A1 * | 9/2007 | Takashima et al. | 310/71 |
| 2007/0296288 A1 * | 12/2007 | Hussey et al. | 310/68 C |
| 2007/0296292 A1 * | 12/2007 | Kienzler et al. | 310/71 |
| 2009/0121565 A1 * | 5/2009 | Ihara et al. | 310/71 |
| 2009/0127948 A1 * | 5/2009 | Shimizu et al. | 310/71 |

FOREIGN PATENT DOCUMENTS

| | | |
|---|---|---|
| EP | 1 328 058 | 7/2003 |
| EP | 1 876 685 | 1/2008 |

OTHER PUBLICATIONS

International Preliminary Report on Patentability and Written Opinion, issued in corresponding International Application No. PCT/EP2010/005130.

* cited by examiner

ARRANGEMENT FOR PRODUCING A STAR CONNECTION, IN PARTICULAR OF THE STATOR WINDINGS OF AN ELECTROMOTOR, AND ELECTROMOTOR

FIELD OF THE INVENTION

The present invention relates to an arrangement for producing a star connection of stator windings of an electromotor.

BACKGROUND INFORMATION

In the case of electromotors designed as three-phase motors, it is generally known for the stator windings assigned to the individual phases to be interconnected by the end regions thereof in a star connection.

SUMMARY

Example embodiments of the present invention further refine an arrangement having a star interconnection.

With regard to the arrangement for producing a star connection for an electromotor, in particular a three-phase motor, the among features of example embodiments of the present invention are that first crimp sleeves are slid onto stator winding-wire end regions and joined thereto, the first crimp sleeves being joined to the second crimp sleeves by a respective welded connection, the second crimp sleeves being slid onto an electrical line and joined thereto.

It is beneficial in this context that only minimal space is required in the end region since the connections are realized within the stator winding area. Thus, a simple and reliable realization is rendered possible there. This is because each connection point may be individually realized and controlled.

In example embodiments, the welded connection is produced by contact welding, in particular, by electrical contact welding and/or pressure welding. It is advantageous that a welded connection point may be quickly and simply produced with a high degree of reliability by briefly pressing the crimp sleeves against each other, thus by generating a high contact pressure while simultaneously feeding current to the connection point between the crimp sleeves.

In example embodiments, these second crimp sleeves are mutually spaced apart. It is beneficial that the connection points are separate, individual points and are not realized at one single shared point. Thus, they are easily accessible and readily controllable.

In example embodiments, the electrical line is a stranded conductor. Even if one of the litz wires of the stranded conductor fails, the current may be advantageously conducted through the other litz wires. Moreover, high current intensities may be realized since, relative to the stranded conductor volume, a large surface area is available for the current flow.

In example embodiments, the stranded conductor is brought out by one of the ends thereof into the connecting region, into which the ends of the stator winding wires are also brought out. In this context, it is advantageous that the star point is brought out in the connecting region and may be further connected there using a neutral conductor, for example; or, alternatively, the potential is monitored at the star point.

In example embodiments, the crimp sleeves are crimped on. It is beneficial that a fixed and reliable, but also a simple electrical connection device is connectable to the winding wire, respectively to the stranded conductor.

In example embodiments, the other end of the stranded conductor is extended further into the stator winding area. It is beneficial that further star points are connectable.

In example embodiments, a stator winding is assigned to each phase, each stator winding wire being composed of a plurality of, in particular, parallel extending, individual wires. It is beneficial that high current intensities are permissible.

In example embodiments, a first crimp sleeve is slid onto each individual wire in the particular stator winding-wire end region and joined thereto. It is beneficial that each wire may be individually connected, thereby making a high quality attainable.

In example embodiments, the winding wire is fabricated from a cupriferous material and the crimp sleeves from an aluminous material or from a sheet-steel part. It is advantageous in this context that a low transition resistance value is attainable.

An important feature of the electromotor is that an arrangement as described above is used for the design thereof. It is beneficial that the star point is interconnectable within the interior space of the stator winding, so that there is no need to bring out the stator winding wires ends to be interconnected.

In example embodiments, the stator windings are interconnected in a star connection, in particular within the stator winding area. In is advantageous in this context that the connecting region only requires a minimal spatial volume.

Example embodiments of the present invention are explained in greater detail in the following with reference to the figures:

DETAILED DESCRIPTION OF THE DRAWINGS

Figure 1:
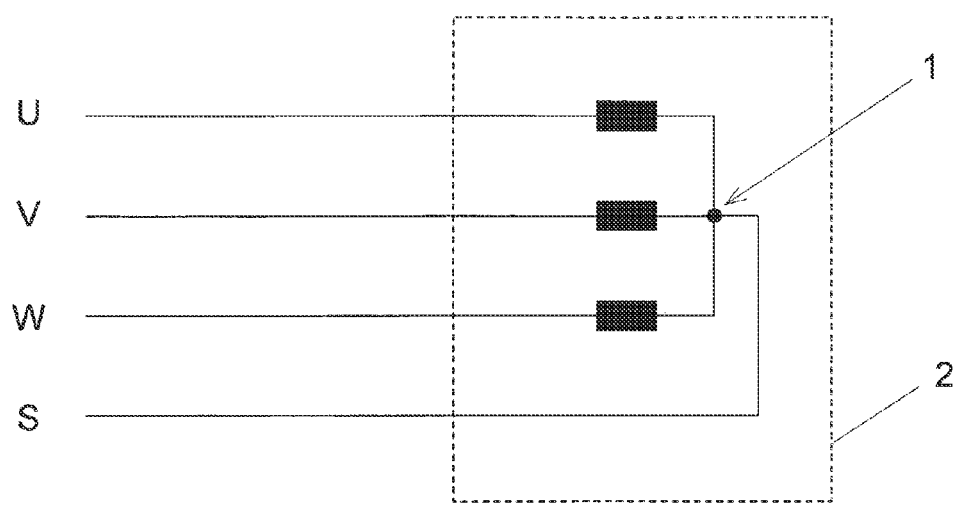
FIG. 1 shows an embodiment according to the present invention.

Stator windings (u, v, w) of an electromotor are shown in FIG. 1. The stator windings are realized using winding wire. The respective first end of the winding wires is brought out from the stator winding area to a terminal connection device, such as a terminal board or the like, to establish an electrical connection to supply lines.

The respective other ends are interconnected at a central connection point 1, thus electrically connected so as to form a star point.

Since all of the ends are interconnected at this central connection point 1, it must be configured to be very large and is thus complex and costly. Moreover, difficulty is entailed in controlling and meeting the quality required for the manufacture of this connection.

Figure 2:
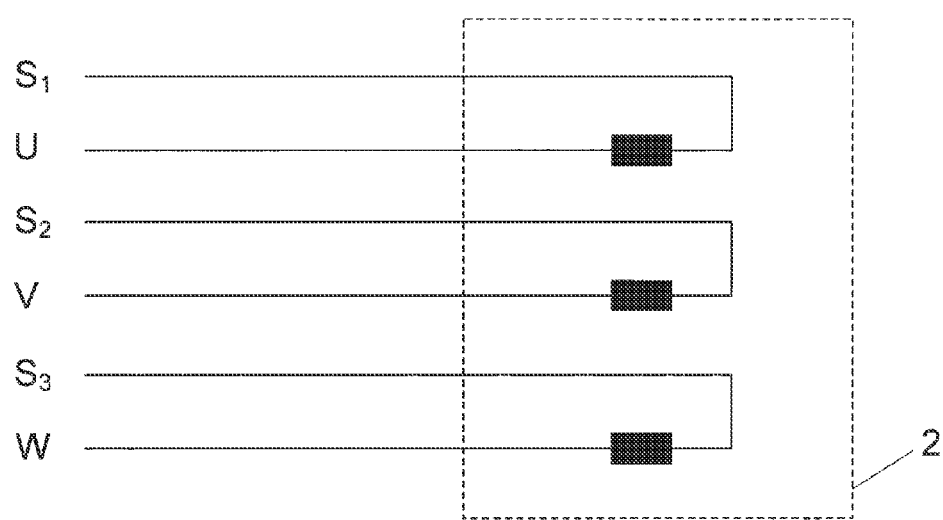
FIG. 2 shows an embodiment according to the present invention.

As an alternative to FIG. 1, FIG. 2 shows ends (s1, s2, s3) being brought out from stator winding area 2. An interconnection may be implemented in this manner at terminal connection device, making it simple and very readily possible to meet the requisite quality. However, this is a complex and costly design that requires large recesses in the stator frame through which the ends are to be routed. Also, additional connections are needed in the region of the terminal connection device in order to produce the star interconnection.

Figure 3:
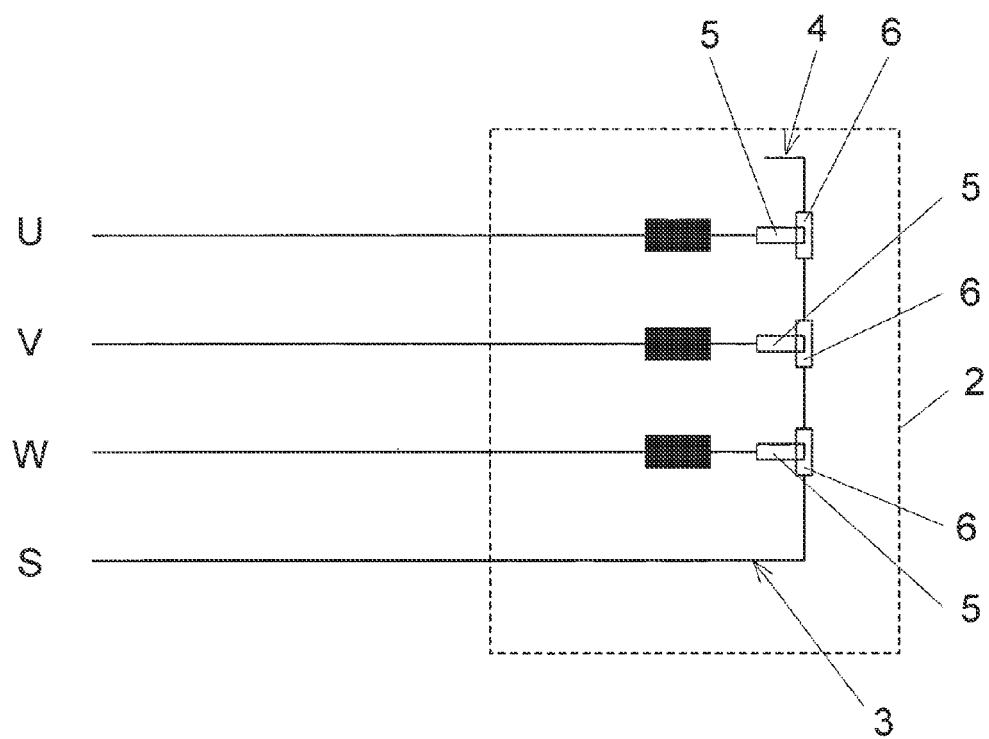
FIG. 3 shows an embodiment according to the present invention.

FIG. 3 shows an exemplary embodiment where a crimp sleeve 5 is slid onto the star point-side end of a respective winding wire of the stator winding, and crimped, thus is squeezingly deformed to produce a force-locking connection with the winding wire.

To produce the star interconnection, a stranded conductor 3 is used, upon which respective crimp sleeves 6 are slid, these crimp sleeves 6 being mutually spaced apart. They are likewise preferably joined to the stranded conductor by crimping, thus squeezingly deformed onto stranded conductor 3 to be force-lockingly connected thereto.

Crimp sleeves 5 are welded to crimp sleeves 6, in particular in crimp welding and/or in contact welding processes. Thus, only one welded connection is to be formed between two respective crimp sleeves. Therefore, the connection is simple to produce and easily and readily controllable, making it possible to verify the quality simply and efficiently. Stranded conductor 3 is likewise brought out by end s thereof from stator winding area into the connecting region. The star point is thus accessible and may be connected to a zero-point potential. Other end 4 of the stranded conductor is extended further into the stator winding area and may be used for further star connection points.

Figure 4:
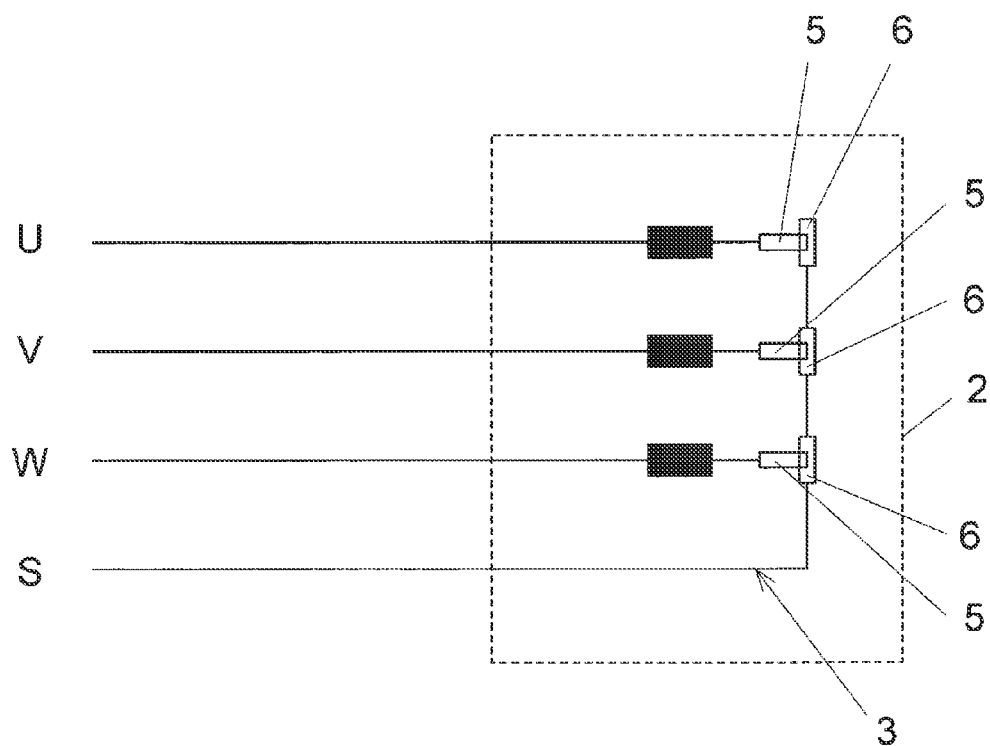
FIG. 4 shows an embodiment according to the present invention.

FIG. 4 shows an exemplary embodiment where, in contrast to FIG. 3, other end 4 is cut off, so that the stranded conductor terminates at a crimp sleeve 6. Thus, only first end region s of stranded conductor 3 is brought out and is accessible in the connecting region.

The electromotor is preferably a three-phase motor, a stator winding being assigned to each of the three phases. It has proven to be advantageous for the transfer of high stator currents that the winding wire have a multicore design, thus, that the winding wire in question be composed of a plurality of individual wires. In a first variant, the individual wires are provided with a shared crimp sleeve and, in a second variant, each individual wire is provided with a respective crimp sleeve.

Figure 5:
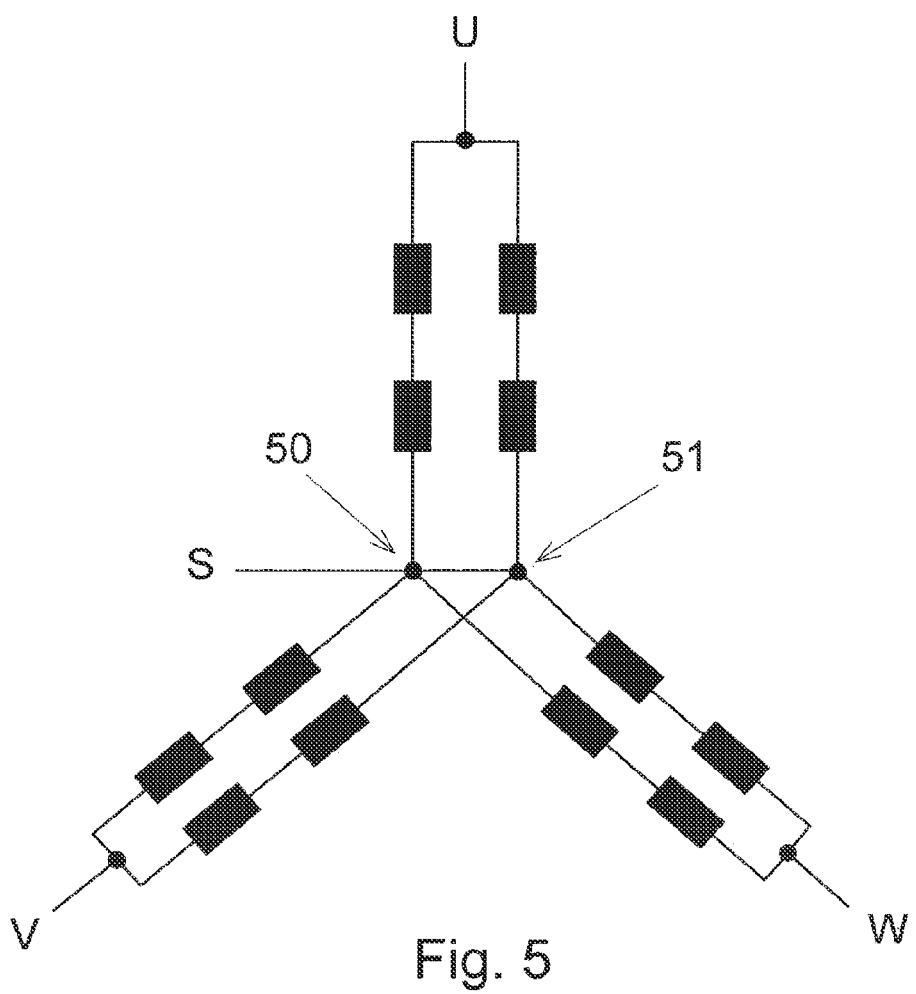
FIG. 5 shows an embodiment according to the present invention.

FIG. 5 shows the star interconnection of a motor having a complex design. In this case, a respective parallel connection of series circuits is realized for each phase (u, v, w). The ends of the first series circuits of each phase are routed to first star point 50, and the ends of second series circuits of each phase to second star point 51. The configuration of star point 50 is comparable to that of FIG. 3, the continuation 4 of stranded conductor 3 being routed to star point 51 which, in turn, is configured analogously to FIG. 3 or 4; thus, first crimp sleeves are connected to second crimp sleeves that are slid onto stranded conductor extension 4 and connected thereto.

Star connection is understood here to always connote star interconnection.

List of Reference Characters
1 central connection
2 stator winding area
3 stranded conductor
4 end region of stranded conductor 3
5 crimp sleeve for the winding wire of the stator winding
6 crimp sleeve, slid onto stranded conductor
50 first star point
51 second star point
u stator winding
v stator winding
w stator winding
s end region of the stranded conductor brought out from the stator winding area
s1 star point lead wire
s2 star point lead wire
s3 star point lead wire

What is claimed is:

1. An arrangement comprising,
a star connection of a stator windings of an electromotor, first crimp sleeves being slid onto stator winding-wire end regions and joined thereto;
wherein the first crimp sleeves are joined to second crimp sleeves by a respective welded connection, the second crimp sleeves being slid onto an electrical line and joined thereto.

2. The arrangement according to claim 1, wherein the electromotor includes a three-phase motor.

3. The arrangement according to claim 1, wherein the welded connection is a connection produced by at least one of (a) contact welding, (b) electrical contact welding, and (c) pressure welding.

4. The arrangement according to claim 1, wherein the second crimp sleeves are mutually spaced apart.

5. The arrangement according to claim 1, wherein the electrical line includes a stranded conductor.

6. The arrangement according to claim 5, wherein the stranded conductor is brought out by one end thereof into a connecting region, into which ends of the stator winding wires are also brought out.

7. The arrangement according to claim 6, wherein an other end of the stranded conductor is extended further into a stator winding area to form another star point.

8. The arrangement according to claim 1, wherein the crimp sleeves are crimped on.

9. The arrangement according to claim 1, wherein each phase has a stator winding or a parallel connection of series circuits of individual windings assigned thereto.

10. The arrangement according to claim 1, wherein each stator winding wire includes a plurality of parallel extending, individual wires;
each individual-wire end region being connected to a first crimp sleeve that is electrically connected to a second crimp sleeve, the second crimp sleeves being slid serially onto an electrical line and joined thereto.

11. The arrangement according to claim 1, wherein a first crimp sleeve is slid onto each individual wire in the particular stator winding-wire end region and joined thereto.

12. An electromotor comprising,
an arrangement including a star connection of a stator windings of an electromotor, first crimp sleeves being slid onto stator winding-wire end regions and joined thereto;
wherein the first crimp sleeves are joined to second crimp sleeves by a respective welded connection, the second crimp sleeves being slid onto an electrical line and joined thereto.

13. The electromotor according to claim 12, wherein the winding wire is fabricated from a cupriferous material and the crimp sleeves from an aluminous material or from a sheet-steel part.

14. The electromotor according to claim 12, wherein the stator winding includes a parallel circuit of at least two series circuits of individual windings that is assigned to a particular phase; a first of the series circuits of each parallel circuit being connected to a first star point, and a second of the series circuits of each parallel circuit being connected to a second star point.

15. A method for producing a star connection for an electromotor, including a star connection of stator windings, comprising:

sliding first crimp sleeves onto stator winding-wire end regions and joining the first crimp sleeves onto the stator winding-wire end regions;
joining the first crimp sleeves to second crimp sleeves by a respective welded connection; and
sliding the second crimp sleeves onto an electrical line and joining the second crimp sleeves to the electrical line;
wherein mechanical and electrical connection between the first crimp sleeves and the second crimp sleeves being produced by at least one of (a) weld connecting and (b) spot-weld connecting.

* * * * *